United States Patent [19]

Hocker et al.

[11] Patent Number: 4,468,294

[45] Date of Patent: Aug. 28, 1984

[54] ACOUSTIC DESENSITIZATION OF OPTICAL FIBERS BY MEANS OF NICKEL JACKETS

[75] Inventors: G. Benjamin Hocker, Minnetonka; John D. Skogen, Burnsville, both of Minn.

[73] Assignee: Honeywell Inc., Minneapolis, Minn.

[21] Appl. No.: 496,143

[22] Filed: May 19, 1983

[51] Int. Cl.³ ............................................. C25D 5/54
[52] U.S. Cl. ................................... 204/27; 204/38 B
[58] Field of Search .................... 204/27, 38 B, 41, 20

[56] References Cited

U.S. PATENT DOCUMENTS

| | | | |
|---|---|---|---|
| 3,280,012 | 10/1966 | Clinehens | 204/20 |
| 3,657,076 | 4/1972 | Bernstein | 204/20 |
| 3,896,010 | 7/1975 | Vetter | 204/27 |

Primary Examiner—T. M. Tufariello
Attorney, Agent, or Firm—Omund R. Dahle

[57] ABSTRACT

In the field of fiber optic acoustic sensors, a method for acoustic desensitization of certain sections of optic fibers by means of the use of higher elastic modulus coatings, such as an electrodeposited nickel jacket.

7 Claims, 3 Drawing Figures

ACOUSTIC DESENSITIZATION OF OPTICAL FIBERS BY MEANS OF NICKEL JACKETS

The U.S. Government has rights in this invention pursuant to Contract Number N00173-80-C-0424 awarded by the Department of the Navy.

BACKGROUND & SUMMARY OF THE INVENTION

The field of the invention is fiber optic acoustic sensors (underwater fiber optic hydrophones), and more particularly in the desensitizing of certain sections of the optic fiber by means of a nickel jacket.

Fiber optic acoustic sensors have been described for use as underwater hydrophones. It is known that such optic fibers are acoustically sensitive, and can be made to have increased acoustic sensitivity by the use of compliant coatings. That is, the use of elastically compliant (low modulus) coatings on optical fibers is known to enhance their sensitivity to pressure/acoustic signals when used in interferometric fiber optic sensors.

For interferometric fiber optic sensors of this type, it is also desirable to have some fibers or some sections of fibers acoustically insensitive. Use of the same type analysis as used for compliant coatings to describe the use of higher elastic modulus coatings, such as electrodeposited nickel, shows that pressure and acoustic sensitivity is decreased by the higher elastic modulus coating. A typical required nickel coating or jacket thickness is predicted to be 10% to 30% of the optic fiber diameter, i.e. 10 to 20 μm thickness for a 100 μm diameter fiber.

DESCRIPTION

Figure 1:
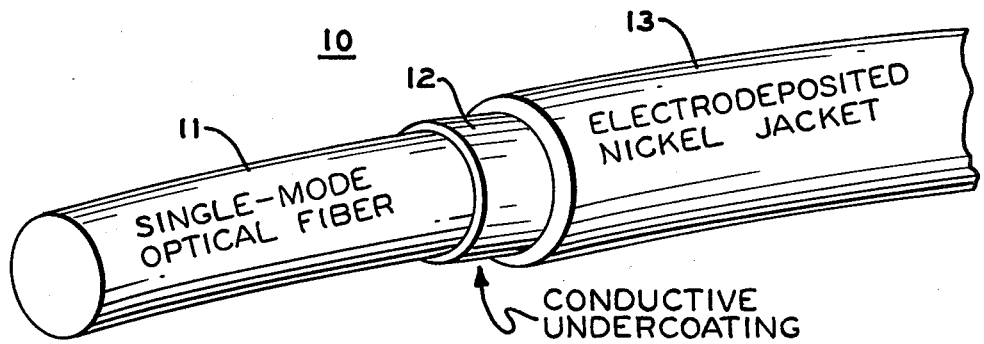
FIG. 1 is a diagrammatic representation of the optic fiber coated with the electrodeposited nickel jacket.

The optic fiber 10 of FIG. 1 is intended for use as an acoustic sensor in which coherent light from a laser source, not shown, is transmitted through the pressure sensitive optic fiber. Thus pressure (acoustic energy) on the fiber, which results in a deformation of the fiber, causes a change in the relative phase of the light emanation from the optic fiber and which phase change can be detected. The phase change of the light is caused by changes in the fiber physical length and optical index of refraction due to pressure/acoustic effects. For interferometric fiber optic sensors of this type, it is desirable to localize fiber sensitivity and have some sections (e.g., lead-in or lead-out sections) of the fiber acoustically insensitive. The use of a coating or jacket material of high elastic modulus around the optic fiber is effective to decrease the pressure and acoustic sensitivity of the fiber. A jacket of the high elastic modulus metal nickel is very effective in desensitizing the optic fiber.

Our theoretical analysis indicates that, for a given fiber with certain dimensions, optical properties and elastic properties, it is possible to choose a jacket material and thickness which reduces the theoretical acoustic sensitivity of the jacketed fiber to zero. This is shown graphically in FIG. 2, which is a plot of the calculated pressure sensitivity $\Delta\phi/\phi\Delta P$ versus coating thickness of a single mode core fiber coated with nickel. Experimental results bear out the theoretical results. For many common types of fibers, nickel is a preferred choice of jacket material because of its high elastic modulus which effectively desensitizes the fiber with a relatively thin coating of nickel. A typical required jacket thickness may be 10% to 30% of the fiber diameter, that is, a nickel jacket of 10 to 30 μm thickness for a 100 μm diameter fiber.

In the theoretical considerations of desensitization of the optical fiber the pressure sensitivity of the optical phase in a fiber is identified as $\Delta\phi/\phi\Delta P$, where $\Delta\phi$ is the shift in the phase $\phi$ that is due to a pressure change $\Delta P$. If a given pressure change $\Delta P$ results in a fiber-core axial strain $\epsilon_z$ and radial strain $\epsilon_r$, it can be shown that $$\Delta\phi/\phi = \epsilon_z - (n^2/2)[(P_{11}+P_{12})\epsilon_r + P_{12}\epsilon_z] \tag{1}$$

Here $P_{11}$ and $P_{12}$ are the elasto-optic coefficients of the core and n is the refractive index of the core. As can be seen, the pressure sensitivity is due to the effect of the fiber-length change [first term in Eq. (1)] and to the effect of the refractive-index modulation of the core, which is related to the photoelastic effect [second and third terms in Eq. (1)]. These effects are generally of opposite polarity, with the largest contribution coming from the axial-strain term.

Figure 2:
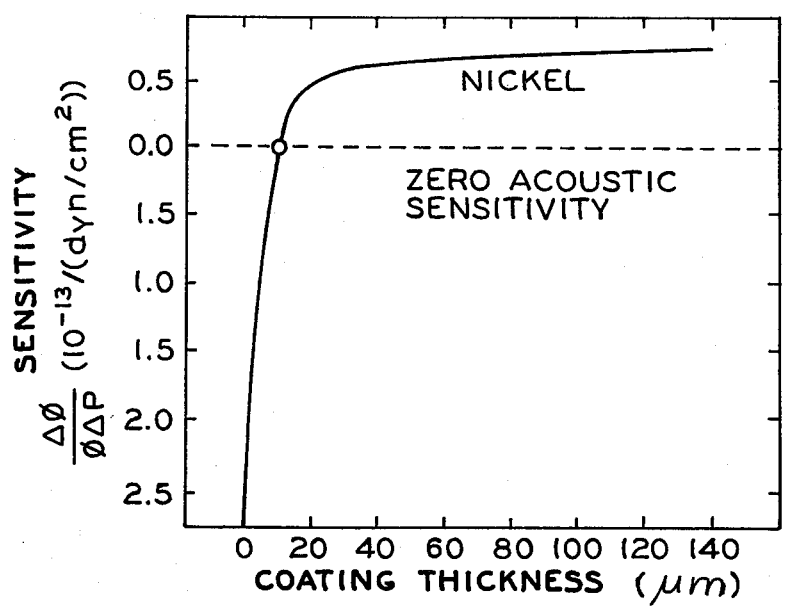
FIG. 2 is a graphical presentation of calculated pressure sensitivity $\Delta\phi/\phi\Delta P$ versus nickel coating thickness of the single mode bare optic fiber.

It can be seen that substantially reduced sensitivity can be achieved if the fiber is coated with high-bulk modulus materials, which reduce the relative contribution from $\epsilon_z$. In fact, zero sensitivity is predicted for specific values of coating thickness that exactly balance the two effects. Thus FIG. 2 shows the calculated sensitivity $\Delta\phi/\phi\Delta P$ of a nickel coated fiber as a function of the thickness of the nickel coating. As can be seen from FIG. 2, as the thickness of the nickel jacket increases, the pressure sensitivity decreases rapidly; it crosses zero and then changes sign.

For sensor applications, in order to localize the sensing area to a strategic section along the fiber, it is desirable to coat long lengths of lead fibers with the nickel jackets—perhaps hundreds of meters. This fact, plus the thickness of nickel required, and the thin cylindrical geometry of the fiber make the usual thin film deposition techniques such as evaporation or sputtering nickel inappropriate.

In this invention we utilize a process comprising electrodeposition (electroplating) to produce the nickel jackets. First a thin electrically conductive undercoating 12 is deposited on the fiber. This conductive undercoating can be deposited in several ways, firstly an aluminum freeze coating step by passing the fiber through a molten bath of aluminum, or secondly by r.f. sputtering on a thin metal layer or layers. An example of the latter is ~400 Å of chromium for adhesion followed by sputtering ~4000 Å of copper. Then the undercoated fiber is run through a plating cell containing a nickel electroplating solution (for example a standard Watt's bath, or a nickel sulfamate bath, etc.) and an electrical current is passed through the plating solution to the fiber undercoat layer to electrochemically deposit nickel 13 on the undercoated fiber surface. By steadily pulling the undercoated fiber through the plating cell, a long length of fiber can be coated with nickel. The fiber being immersed in the liquid plating solution becomes uniformly coated around its circumference.

The coating thickness is controlled by a combination of the plating current density, and the speed at which the fiber is pulled through the plating cell.

Figure 3:
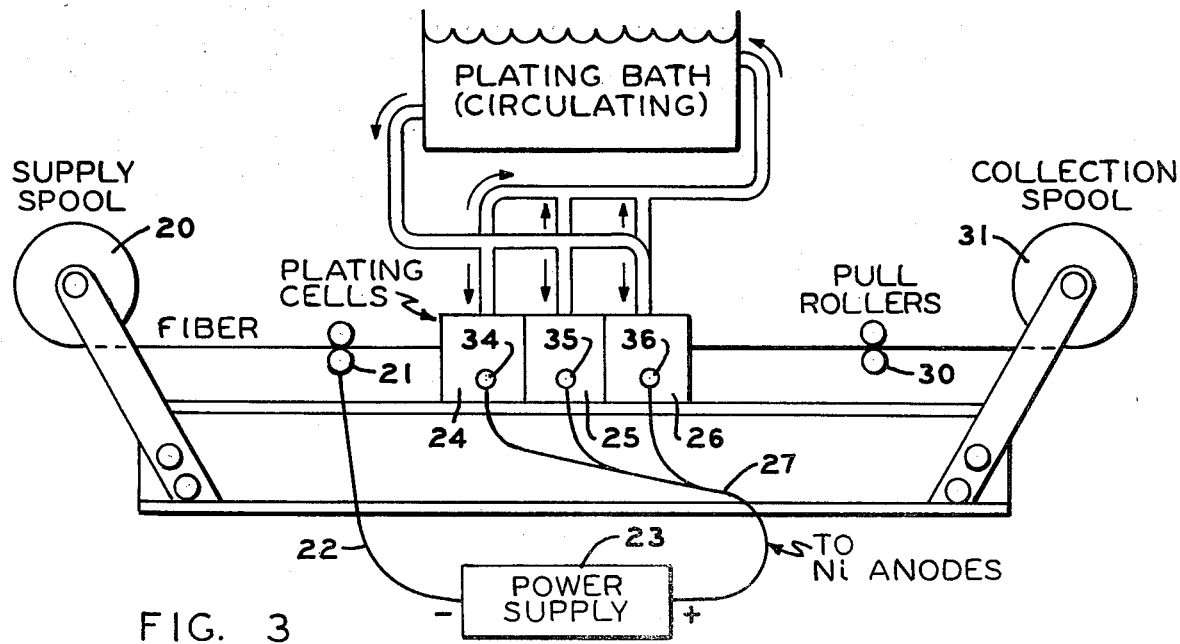
FIG. 3 is a schematic representation of a plating system for electroplating the optic fiber with nickel according to the invention.

FIG. 3 shows a schematic drawing of a system for electroplating the optic fiber according to the invention. The optic fiber 11 with conductive undercoat 12 is unwound from supply spool 20 and passes conductive rollers 21 which are energized through conductor 22 to one terminal of power supply 23. The fiber then passes through plating cells 24, 25, 26, the nickel plated fiber then passes through pull rollers 30 and onto the take-up or collection spool 31. The other terminal of the power supply is connected by a conductor 27 to the nickel anodes 34, 35 and 36 in the plating cells 24, 25 and 26. In place of conductive rollers 21, a mercury contact may be used to transmit current to the conductive coating on the fiber.

The embodiments of the invention in which an exclusive property or right is claimed are defined as follows:

1. A method for acoustic desensitization of selected portions of an acoustically sensitive optic fiber hydrophone by fabricating a nickel coated optic fiber comprising the steps of:
   providing an extended length of acoustically responsive optic fiber hydrophone;
   depositing an electrically conductive undercoating on and along at least a selected portion of said length of optic fiber hydrophone; and,
   determining the thickness of nickel layer required to achieve acoustic desensitization of the coated portion of the optic fiber and electroplating a layer of nickel over said undercoated optic fiber portion of a sufficient thickness of said nickel layer to effect acoustic desensitization of said optic fiber portion.

2. The method according to claim 1 wherein the thickness of the electroplated nickel is in the range of about 10% to about 30% of the diameter of the optic fiber.

3. The method according to claim 2 wherein the fiber diameter is on the order of 100 $\mu$m and wherein the electroplated nickel thickness is on the order of 10 to 30 $\mu$m.

4. The method according to claim 1 in which the undercoating is metal film.

5. The method according to claim 4 in which the metal film is sputtered on the fiber.

6. The method according to claim 5 in which the sputtered metal fiber comprises sputtered copper with an undercoating of sputtered chromium.

7. A method for acoustic desensitization of selected portions of an acoustically sensitive optic fiber hydrophone by fabricating a nickel coated optic fiber comprising the steps of:
   providing an extended length of acoustically responsive optic fiber hydrophone;
   depositing an adhesive undercoating of chromium on and along at least a selected portion of said length of optic fiber hydrophone;
   depositing an electrically conductive undercoating of copper over said chromium on said selected portion of said length of optic fiber hydrophone; and,
   determining the thickness of nickel layer required to achieve acoustic desensitization of the coated portion of the optic fiber and electroplating a layer of nickel over said undercoated optic fiber of a sufficient thickness to achieve acoustic desensitization of said optic fiber.

* * * * *